E. G. CLEMENTS.
BATTERY GRID PASTING APPARATUS.
APPLICATION FILED APR. 19, 1916. RENEWED FEB. 13, 1919.

1,303,030.

Patented May 6, 1919.
2 SHEETS—SHEET 1.

E. G. CLEMENTS.
BATTERY GRID PASTING APPARATUS.
APPLICATION FILED APR. 19, 1916. RENEWED FEB. 13, 1919.

1,303,030.

Patented May 6, 1919.
2 SHEETS—SHEET 2.

Inventor
Everett G. Clements,
By Radford & Doolittle,
Attorneys

UNITED STATES PATENT OFFICE.

EVERETT G. CLEMENTS, OF WASHINGTON, DISTRICT OF COLUMBIA, ASSIGNOR TO THE PREST-O-LITE COMPANY, INC., A CORPORATION OF NEW YORK.

BATTERY-GRID-PASTING APPARATUS.

1,303,030.  Specification of Letters Patent.  Patented May 6, 1919.

Application filed April 19, 1916, Serial No. 92,205. Renewed February 13, 1919. Serial No. 276,861.

*To all whom it may concern:*

Be it known that I, EVERETT G. CLEMENTS, a citizen of the United States, residing at Washington, District of Columbia, have invented and discovered certain new and useful Improvements in Battery-Grid-Pasting Apparatus, of which the following is a specification.

The present invention relates to a method of and apparatus for filling storage battery grids, and consists in the steps of procedure and arrangements and combinations of elements hereinafter described and particularly set forth in the accompanying claims.

The invention has for its purpose to provide a system for mechanically filling the grids with the lead oxid paste, comprising the filling in the grids to uniform thickness and consistency, and to smooth off or plane the grid surfaces, all in one contiuous operation and with the aforesaid steps taken in the sequence given.

A further purpose of the invention is to produce an apparatus necessary to the carrying out of the foregoing operations, wherein the grid frames and all materials are handled in an expeditious and easy manner, and the discharged removable parts automatically returned to initial position for immediate re-use, thereby requiring the minimum labor for working, and economy of area in the plant.

Another object of the invention resides in keeping the lead oxid paste in a vessel under constant pressure and forcing the grids through the paste mass without requiring any of the machinery to pass therethrough, and in replenishing the paste by a feeder that is automatically controlled by the pressure residing in the vessel.

An apparatus embodying my said invention is illustrated in the accompanying drawings, wherein—

Figure 1:
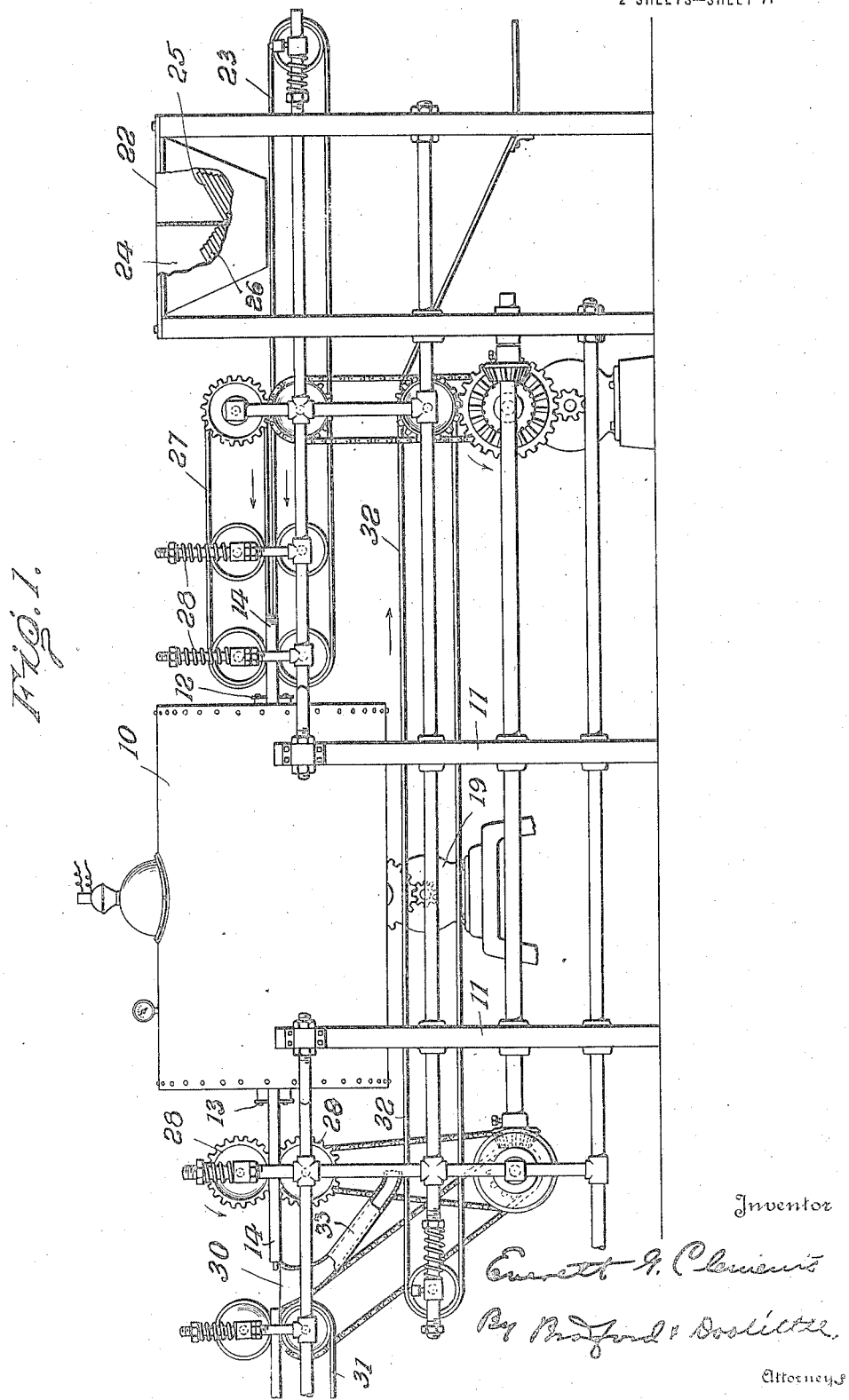
Figure 2:
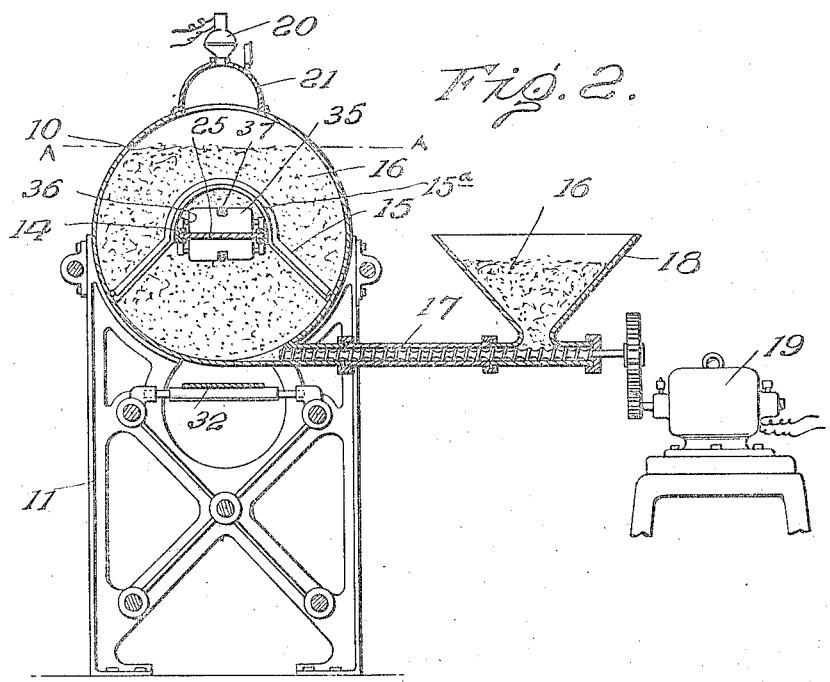
Figure 3:
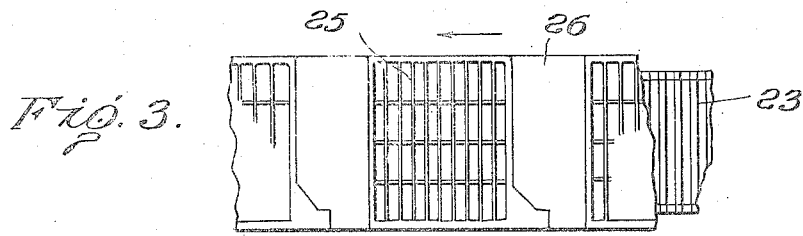
Figure 4:
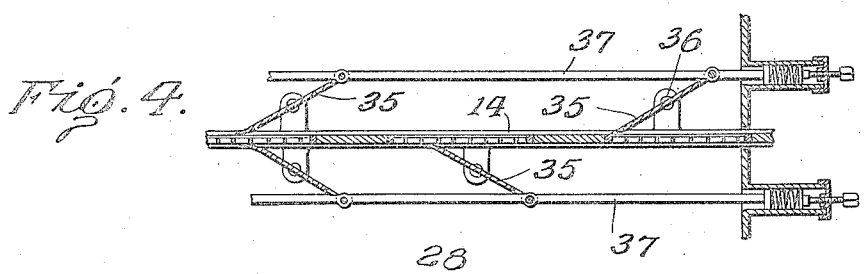
Figure 5:
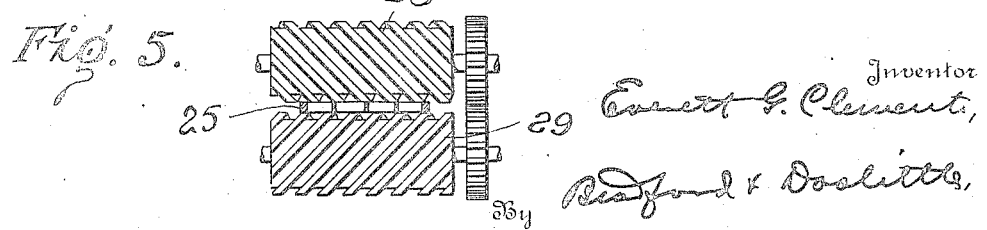

Figure 1 is a side elevational view of the apparatus complete,

Fig. 2 a transverse sectional view thereof taken through the paste holding vessel, Fig. 3 a detail view of a section of the grid conveyer, Fig. 4 a detail view of the paste applying device mounted in the paste holding vessel, and Fig. 5 a detail view of the finishing or planing rollers for finally treating the grids.

Referring to the construction in further detail and with like reference characters indicating corresponding parts, the apparatus consists of a cylindrical paste receptacle or tank 10, mounted on a suitable frame-work 11, and at its respective ends, said vessel is provided with openings 12 and 13 forming the inlet and discharge passages, respectively, for the grids. A pair of grooved tracks, of channel-iron construction, extend entirely through the paste vessel and project from either end thereof, as shown in Fig. 1, to receive the grids from the feeding conveyer and discharge the same onto the receiving conveyer, in a manner to be further explained. The tracks 14 are supported within the tank by a bracket having two arms 15 connected by a yoke-piece 15ᵃ of sufficient flexibility to allow said tracks 14 to expand or spread apart when the moving grids encounter any obstruction on the tracks that would otherwise cause the same to be jammed.

The vessel 10 is adapted to be filled with paste of lead oxid, which is maintained therein under a pressure of about one hundred pounds to the square inch, and which is kept constant during the operation of the machine by a screw conveyer 17 that feeds paste from the receptacle or hopper 18 and forces the same into the tank at a point adjacent the bottom thereof. The paste in the tank is normally kept at about the level indicated by the line A—A (see Fig. 2), providing an air space in which the trapped air is compressed by the inflow of paste into the vessel, thus giving flexibility or resiliency to the paste mass, to the end that the grids will have the body of paste forced therein under great consistency and at uniform pressure throughout.

The conveyer 17 is operated by the electric motor 19 through a suitable gearing, and said motor is adapted to be driven at variable speeds dependent upon the air pressure in the tank. This control of the motor is effected through a pressure governor 20 that communicates with the air dome 21 mounted on the vessel 10, and said governor is of appropriate type for regulating a rheostat, or other resistance, in the conductors leading to the motor.

The grids 25 (see Fig. 3), of the usual form, are contained within a suitable hopper 22, from which they are discharged singly, and at proper intervals, onto the endless conveyer 23; and a second hopper 24, holding fill-blocks or spacing members 26, is located adjacent said grid hopper, and said fill-blocks are adapted to be discharged at the proper intervals for location between the grids 25, to the end that the conveyer belt 23 will forward the grids and fill-blocks in alternate arrangement to the receiving end 12 of the paste vessel, and where they are engaged upon opposite sides by the tracks 14.

The grids in succession, and with fill-blocks between, are adapted to be forcibly moved through the paste mass within the vessel 10 by means of an endless feeding belt 27 suitably mounted on pulleys journaled on the frame and connected to be positively driven; and a pair of tensioning springs 28, acting on the belt carrying pulleys, hold said belt in frictional engagement with the passing train of grids and fill-blocks, and under sufficient tension to forcibly feed the latter through the length of the paste mass in the vessel 10, whence they receive the paste body of lead oxid.

A device for applying the paste uniformly to the grids and prevent the formation of air pockets within the cells, is located in the vessel 10 and consists of a plurality of wiper plates or blades 35 pivotally mounted in suitable bearings 36 and disposed transversely of the grids, above or below the same, and exerting sufficient pressure on the paste within the grid pockets to prevent or destroy the formation of air pockets within the cells of the grids. The several pivoted plates 35 are held at the proper angle, and under the tension required, by the pair of rods 37 pivotally connected with said plates and engaging with the spring tensioning devices (see Fig. 4) that may be regulated as required. The pivoted plates 35 are disposed in alternate relation, to the end that the passing grid will have the paste in the cells thereof subjected to pressure, first in one direction, and then in another, i. e., from each plate of the upper series the paste in the grid cells is subjected to a downward force, while the successive plates of the lower series subject the grid pockets to an upward force and alternating with said downwardly directed forces.

The discharged grids, issuing through the outlet opening 13, have the loosely surrounding paste mass removed therefrom by a suitable die located at said opening, and on issuing from the die, the pasted grids are subjected to the action of a pair of rollers 28 having spiral ribs that bear against the opposite faces of the pasted grid and plane off or scrape said surfaces to bring the surface of the paste mass in the true plane of the edges of the cells and frame of the grid. The pair of rollers 28 are set to operate at fixed distances from the passing grids, and rotate counterwise to the direction of travel and are geared to work at a high rate of speed through a suitable transmission connected with the conveyer drives.

After treatment by the rollers 28, the finished grids are delivered onto a suitable conveyer 31 that is located to receive the same from the discharge end of the tracks 14, and a space 30 is interposed between said tracks 14 and the receiving belt 31, to the end that the fill-blocks will fall into the receiving hopper 33 and thence be delivered onto the conveyer belt 32 that travels to carry the same back to the feeding end of the machine, where they are again ready for instant use. Said space 30 is insufficient to prevent the grids from passing on to the receiving belt 31, for the purpose above stated.

It is obvious that those skilled in the art may vary the details of construction and arrangement of parts without departing from the spirit of my invention, and therefore I do not wish to be limited to such features except as may be required by the claims.

Having thus fully described my said invention, what I claim as new and desire to secure by Letters Patent, is:

1. The method of pasting battery grids which consists in applying the paste to the grid frame by fluid pressure acting on the paste mass substantially as set forth.

2. The method of pasting battery grids which consists in applying the paste to the grid frame by fluid pressure acting on the paste mass, and then subjecting the pasted grid to the action of mechanical pressure, substantially as set forth.

3. The method of pasting battery grids which consists in applying the paste to the grid frame by fluid pressure acting on the paste mass, and maintaining said fluid pressure constant by replenishing the paste consumed, substantially as set forth.

4. The method of pasting battery grids which consists in maintaining a supply of paste under constant fluid pressure acting on the paste mass, and passing the grids through the paste mass, substantially as set forth.

5. The method of pasting battery grids which consists in maintaining a supply of paste under constant pressure, passing the grids through the paste mass, and causing the paste to be forced through the grid cells alternately in opposite directions during the travel of the grids, substantially as set forth.

6. In a battery grid pasting apparatus, the combination of a paste receptacle, means for conveying the grids through the paste in the receptacle, and means within said receptacle operable by the movement of said grids for causing the paste to pass through the grids as they are conveyed through said receptacle, substantially as set forth.

7. In a battery grid pasting machine, the combination of a paste receptacle, means for conveying the grids successively to the receptacle, and means within the receptacle for causing the paste to pass through the grids first in one direction and then in the other during the travel of said grids, substantially as set forth.

8. In a battery grid pasting apparatus, the combination of a paste receptacle, means for conveying the grids to and through said paste receptacle, means for initially forcing the paste into the grids within the receptacle, and means located outside of the receptacle for packing, scraping and conveying the said grids from said receptacle, substantially as set forth.

9. In a battery grid pasting apparatus, the combination of a paste receptacle adapted to keep the paste therein under pressure, means for conveying the grids to and from the receptacle, and means for feeding paste to the receptacle and maintaining the pressure therein constant, substantially as set forth.

10. In a battery grid pasting apparatus, the combination of a paste receptacle adapted to keep the paste therein under pressure, means for conveying the grids to and from the receptacle, means located outside of the receptacle for forcing the grids through the paste mass within the receptacle, means for replenishing the paste consumed by the grids and maintaining constant the pressure in the receptacle, and means for causing the paste to be forced through the grid cells alternately in opposite directions during the travel of the grids, substantially as set forth.

11. In a battery grid pasting apparatus, the combination of a paste receptacle, means for passing the grids through the receptacle, and coöperable fluid pressure and mechanical pressure means for forcing the paste through the cells of the grids during the passage of the grids through the receptacle, substantially as set forth.

12. In a battery grid pasting apparatus the combination of means for applying paste to the grids, a grid containing receptacle, and means for conveying the grids from said receptacle to the pasting means, substantially as set forth.

13. In a battery grid pasting apparatus the combination of a paste holding receptacle, a grid holding receptacle, means for transferring the grids from said holding receptacle to the paste containing receptacle, and means for forcing the paste into said grids while in said paste receptacle, substantially as set forth.

14. The method of pasting battery grids which consists in conveying the grids consecutively and continuously to a receptacle containing paste and immersing said grids in said paste while the grids are moving, substantially as set forth.

15. The method of pasting battery grids which consists in conveying the grids continuously through the receptacle containing paste, immersing the grids in said paste and maintaining said paste under pressure, whereby said paste is caused to penetrate said grids while moving, substantially as set forth.

16. The method of pasting battery grids which consists in constantly moving the grids through a receptacle containing paste under pressure, substantially as set forth.

17. The method of pasting battery grids which consists in constantly moving the grids through a receptacle containing paste and maintaining said paste under substantially uniform pressure.

18. The method of pasting battery grids which consists in maintaining paste under pressure in a receptacle, and constantly moving the grids through the paste in the receptacle, substantially as set forth.

19. The method of pasting battery grids which consists in maintaining a uniform quantity of paste in a container, maintaining substantially uniform pressure on said paste, and constantly moving the grids to be pasted through the paste in the container, substantially as set forth.

20. The method of pasting battery grids which consists in maintaining a uniform quantity of paste within a container, causing the grids to constantly move through said paste, and causing the paste to penetrate the cells, substantially as set forth.

21. The method of pasting grids which consists in maintaining a uniform quantity of paste within a container, constantly moving the grids through said paste in the container, and causing the paste to pass through the cells in the grids, first in one direction and then in the opposite direction, substantially as set forth.

In witness whereof, I have hereunto set my hand and seal at Washington, District of Columbia, this nineteenth day of April, A. D. nineteen hundred and sixteen.

EVERETT G. CLEMENTS. [L. S.]

Witnesses:
 ELSIE W. STERZER,
 H. H. BYRNE.